(12) United States Patent
Chen

(10) Patent No.: US 8,052,156 B2
(45) Date of Patent: Nov. 8, 2011

(54) BIT HOLDER

(76) Inventor: Ho-Tien Chen, Tainan (TW)

( * ) Notice: Subject to any disclaimer, the term of this patent is extended or adjusted under 35 U.S.C. 154(b) by 758 days.

(21) Appl. No.: 12/172,902

(22) Filed: Jul. 14, 2008

(65) Prior Publication Data

US 2010/0007102 A1   Jan. 14, 2010

(51) Int. Cl.
*B23B 31/06* (2006.01)
*B23B 31/11* (2006.01)

(52) U.S. Cl. ............... 279/143; 279/8; 279/91; 279/101; 81/177.85; 81/438

(58) Field of Classification Search .................. 279/7, 8, 279/89–91, 101, 143, 144; 81/177.85, 438; B23B 31/06, 31/11; B25G 3/30
See application file for complete search history.

(56) References Cited

U.S. PATENT DOCUMENTS

| | | | | |
|---|---|---|---|---|
| 666,510 | A * | 1/1901 | Furbish | 81/177.85 |
| 1,805,330 | A * | 5/1931 | Fegley et al. | 279/90 |
| 2,021,656 | A * | 11/1935 | La Croix | 279/91 |
| 2,349,741 | A * | 5/1944 | McLaughlin | 279/89 |
| 2,429,728 | A * | 10/1947 | McMurtry | 279/8 |
| 2,833,547 | A * | 5/1958 | Selch | 279/91 |
| 3,489,422 | A * | 1/1970 | Selowitz | 279/89 |
| 5,219,250 | A * | 6/1993 | Voorhees | 407/34 |
| 5,957,634 | A * | 9/1999 | Carpinetti | 408/226 |
| 6,511,268 | B1 * | 1/2003 | Vasudeva et al. | 408/239 R |
| 6,745,652 | B2 * | 6/2004 | Chen | 81/438 |
| 7,175,185 | B2 * | 2/2007 | Chen | 279/75 |
| 7,469,909 | B2 * | 12/2008 | Strauch et al. | 279/75 |
| 7,484,736 | B2 * | 2/2009 | Allemann et al. | 279/143 |
| 7,669,860 | B2 * | 3/2010 | Chiang | 279/143 |
| 7,726,664 | B2 * | 6/2010 | Peters | 279/143 |
| 7,735,400 | B2 * | 6/2010 | Chen | 81/429 |
| 7,823,890 | B2 * | 11/2010 | Chen | 279/143 |
| 7,896,357 | B2 * | 3/2011 | Peters | 279/143 |
| 7,922,180 | B2 * | 4/2011 | Meng | 279/143 |
| 2008/0179841 | A1 * | 7/2008 | Chen | 279/143 |
| 2009/0224492 | A1 * | 9/2009 | Lin | 279/82 |
| 2009/0282955 | A1 * | 11/2009 | Chang-Kao | 81/438 |

FOREIGN PATENT DOCUMENTS

TW           532258           5/2003

* cited by examiner

*Primary Examiner* — Eric A Gates
(74) *Attorney, Agent, or Firm* — J.C. Patents

(57) ABSTRACT

A bit holder includes a shank, and a bit sleeve. The shank has a first end portion of a non-circular geometric equiangular cross-section for combining a hand tool, and a second end portion formed with a combining hole having female threads in its wall. The bit sleeve has a through hole for a bit to extend therein, male threads and a circular circumference. The bit sleeve is combined with the shank by engagement of the male threads with the female threads, and the bit sleeve may be rotated to fix with or loosen from the shank by an auxiliary tool for changing the bit. In assembling, the bit is inserted through the through hole of the bit sleeve, and then the male threads of the bit sleeve are engaged with the female threads of the shank by an auxiliary tool fitted with the circular circumference and rotated to keep the bit combined with the shank, with the bit sleeve pressing the bit so as to minimize the tolerance of the gap between them, thus enabling the bit to drive a screw smoothly into an object.

5 Claims, 7 Drawing Sheets

BIT HOLDER

BACKGROUND OF THE INVENTION

1. Field of the Invention

This invention relates to a bit holder, particularly to one including a shank provided with a combining hole, and a bit sleeve provided with a through hole. In combining a bit with the bit holder, the bit is inserted through the through hole of the bit sleeve, and then the male threads of the bit sleeve are engaged with the female threads of the shank. Then an auxiliary tool is fitted around a circular circumference of the bit sleeve, which is successively rotated to combine threadably with the combining hole of the shank, with the lower portion of the bit sleeve pressing an upper portion of the bit so as to minimize the tolerance of the gap between the bit and the shank. Thus the bit sleeve never departs from the shank, and the bit never swings so that the bit can drive a screw effectively and smoothly into an object.

2. Description of the Prior Art

FIGS. 1~3 show three sorts of conventional bit holders, which commonly include a shank 1 and a bit 2.

The shank 1 is provided with a combining hole 10 formed in its front end for being just tightly fitted with a shank 20 of the bit 2. In FIGS. 1 and 2, a lock ball hole 12 is bored on a wall 11 of the combining hole 10 for fitting with a lock ball 13 that is further surrounded by a sleeve 14. In FIG. 3, the wall 11 of the combining hole 10 is previously finished with a C-shaped lock groove 12A employed to engage with a C-shaped lock washer 13A. Either of the two engagements between the lock ball hole 12 and the lock ball 13 and between the C-shaped lock groove 12A and the C-shaped lock washer 13A mentioned previously needs a little space for the lock ball 13 and the C-shaped lock washer 13A to flexibly move about so as to keep the bit 2 conveniently pulled out or plugged in the shank 1.

Next, as shown in FIG. 4, a fourth conventional bit holder is provided with a hole 15 bored in the shank 1 to communicate with the combining hole 10, and a C-shaped lock washer 16 used to fit in the C-shaped lock groove 12A. As the bit 2 is to be pulled out, an auxiliary tool 3 can be inserted into the hole 15 to push upwards so as to release the bit 2 from the shank 1.

In the four conventional bit holders described above, the bit 2 is provided with an annular groove 21 formed around the shank 20 for being fitted with the lock ball 13 or the C-shaped lock washers 13A and 16 so as to keep the bit 2 fixed thereof. In addition, the annular groove 21 can let the lock ball 13 and the C-shaped lock washers 13A and 16 move properly in the lock ball hole 12 and the C-shaped lock groove 12A respectively, so that the bit 2 can be smoothly plugged in or released from the shank 1.

In order to enable the lock ball 13 and the C-shaped lock washers 13A and 16 to properly move about so as to keep the bit 2 smoothly inserted in or pulled out of the shank 1, the thickness (L) of the wall 11 must be sustained in an appropriate range. The conventional bit holders shown in FIGS. 1~3 has a rather large outer diameter (more than 7 mm), unsuitable for being utilized in an automatic screwdriver with a screw band. The fourth conventional bit holder shown in FIG. 4 is purposely designed to lessen the outer diameter of the shank 1 so as to be usable for an automatic screwdriver. However, when the bit 2 is fitted in the combining hole 10 of the shank 1, the bit 2 is blocked such tightly by the C-shaped lock washer 16 that it can not be manually plucked out of the combining hole 10. So the hole 15 is employed to be inserted by an auxiliary tool to help pushing the bit out on basis of leverage. But, with the hole 15 bored in the shank 1, the strength of the shank 1 is to be downgraded, apt to make the shank 1 deformed or broken at the location of the hole 15, posing a loss or a burden to consumers.

FIG. 5 shows a fifth conventional bit holder, which also includes the shank 1 provided with the combining hole 10 formed in its front end, and two lock ball holes 12 cut in the wall 11 of the combining hole 10 for being fitted with the lock balls 13.

In addition, a compression spring 14 is mounted around the wall 11, with its one end pressing on an annular surface 111 of the wall 11 and the other one pressing on an annular surface 140 of a sliding sleeve 14A, enabling it confined between the wall 11 and the sliding sleeve 14A. An annular C-shaped lock washer 112 is put around the front outer circumference of the wall 11 of the combining hole 10 to prevent the sliding sleeve 14A from coming off the shank 1. The sliding sleeve 14A is provided with an annular oblique surface 141 formed around its front end for keeping the bit 2 from being tightly squeezed by the lock ball 13 so as to easily pull it out thereof.

By means of the sliding sleeve 14A, the conventional bit holder shown in FIG. 5 enables the bit 2 easily plugged in or pulled out of the shank 1. However, as the outer diameter (d1) of the sliding sleeve 14A is much larger than the outer diameter (d2) of the shank 1, such a two-part-assembled bit holder can hardly be utilized in an automatic screwdriver. The automatic screwdriver commonly used nowadays is re-positioned by a rebounding force of a compression spring after driving a screw into an object. But, because the circumference of the bit holder is wrapped by screw band holes and their annular circumference, the relevant component of the automatic screwdriver is difficult to come back to its original position owing to a large diameter of the bit holder.

Next, as shown in FIG. 6, a sixth conventional bit holder invented by the inventor of the present invention and disclosed in Taiwan Patent No. 091211788 is devised to overcome the defects existing in the five conventional bit holders mentioned above. It also includes a shank 1 provided with a combining hole 10, a bit 2, and an bit sleeve 3.

The shank 1 is provided with an annular locking groove 101 formed in its wall 100, and an annular oblique surface 102 formed around its outer end.

The bit 2 is provided with a rear portion 22 shaped geometric without any groove formed in its surface for engaging with the shank 1, a front portion 23 including a bit head 230, and an annular petal-shaped portion 24 formed around a surface of the rear portion. The rear portion 22 has a larger diameter than that of the front portion 23.

The bit sleeve 3 is provided with an annular elastic circumference 30 cut with plural grooves 31 employed to enable the annular elastic circumference 30 to be more flexible. The annular elastic circumference 30 has an annular projection 32 formed around its rear end to fit in the annular locking groove 101 of the combining hole 10 of the shank 1.

As the bit sleeve 3 is made of plastics, it must keep the bit 2 tightly fixed with the shank 1 without shaking before operating a hand tool. However, when the bit 2 is operated to whirl with a high speed, it is to get heated to soften the bit sleeve 3 so as to weaken the engagement between the bit sleeve 3 and the bit 2, posing the bit 2 to depart from the shank 1.

And, if the bit 2 is to be loosened from the shank 1, it has to be pulled open by an extra tool, possible to damage the bit sleeve 3. Thus a lot of the bit sleeves 3 must be prepared for spares while operating a hand tool with the bit holder.

Moreover, as the bit sleeve 3 is made of plastics, a rather great tolerance is practically created in engagement of the bit sleeve 3 and the bit 2, posing an unacceptable gap between the bit 2 and the shank 1 so that the bit 2 is to swing while being driven to rotate with a high speed by a hand tool, unable to smoothly and precisely drive a screw into an object.

SUMMARY OF THE INVENTION

The object of this invention is to offer a bit holder adapted to a screw band of an automatic screwdriver with a small outer diameter (less than 7 mm). The bit holder can permit its bit quickly changed, with a tolerance of a gap between the bit and a shank minimized, enabling the bit not to swing so that it can drive a screw smoothly into an object.

The characteristics of the invention are described below.

1. The shank of the bit holder is provided with a first end portion of a non-circular equiangular cross-section for tightly combining with a hand tool.

2. The shank of the bit holder is also provided with a second end portion formed with a combining hole having female threads in its wall 3. The bit sleeve of the bit holder is provided with a through hole for a bit to extend therein, and male threads formed on a rear portion and a circular circumference formed on a front portion. Then the bit sleeve is threadably combined with the shank by engagement of the male threads with the female threads, and the bit sleeve may be rotated to fix with or loosen from the shank by an auxiliary tool for changing the bit.

4. In combining the bit with the bit holder, the bit is inserted through the through hole of the bit sleeve, and then the male threads of the bit sleeve are engaged with the female threads of the shank. Then an auxiliary tool is fitted around the circular circumference, and the bit sleeve is rotated to combine threadably with the combining hole of the shank, with the lower portion of the bit sleeve pressing an upper portion of the bit so as to minimize the tolerance of the gap between the bit and the shank. Thus the bit never swings so that the bit can drive a screw effectively and smoothly into an object.

BRIEF DESCRIPTION OF DRAWINGS

This invention is better understood by referring to the accompanying drawings, wherein.

DETAILED DESCRIPTION OF THE PREFERRED EMBODIMENT

Figure 1:
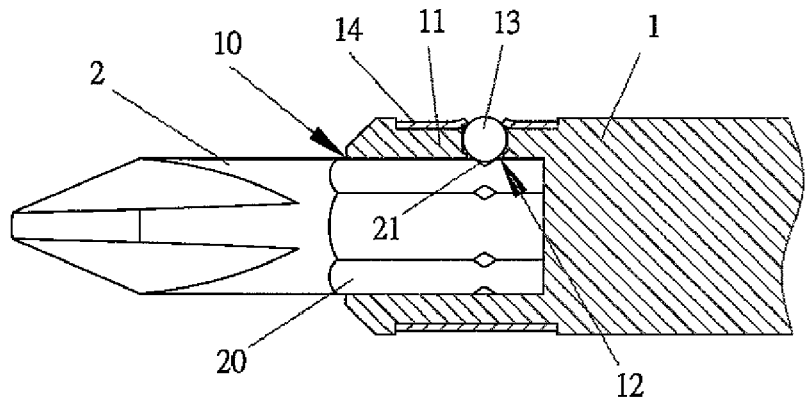
FIG. 1 is a cross-sectional view of a first conventional bit holder.
Figure 2:
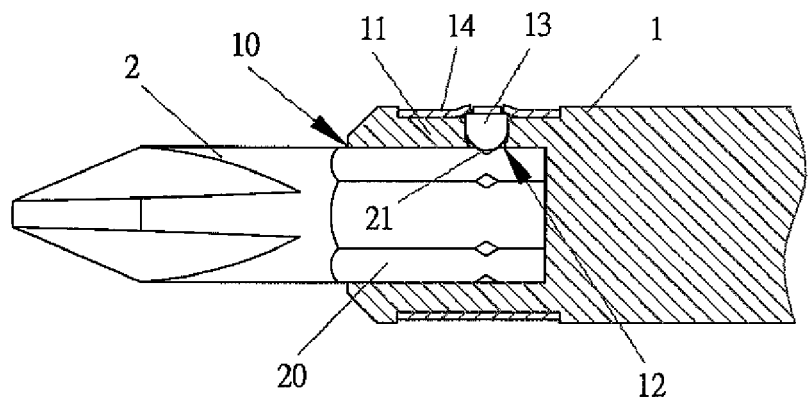
FIG. 2 is a cross-sectional view of a second conventional bit holder.
Figure 3:
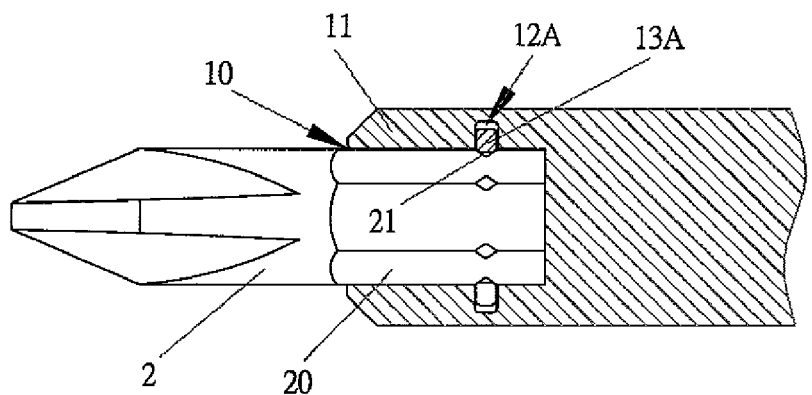
FIG. 3 is a cross-sectional view of a third conventional bit holder.
Figure 4:
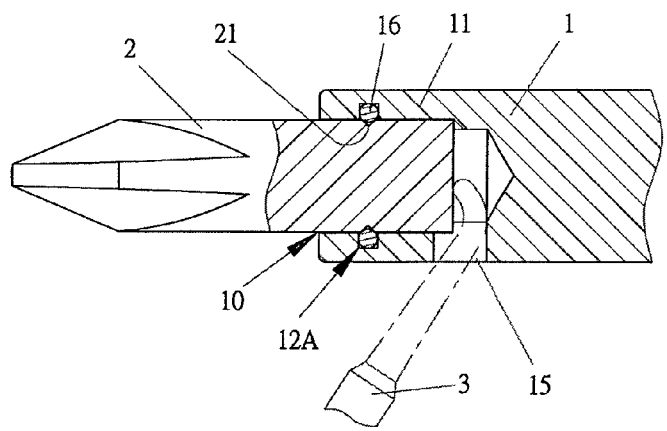
FIG. 4 is a cross-sectional view of a fourth conventional bit holder.
Figure 5:
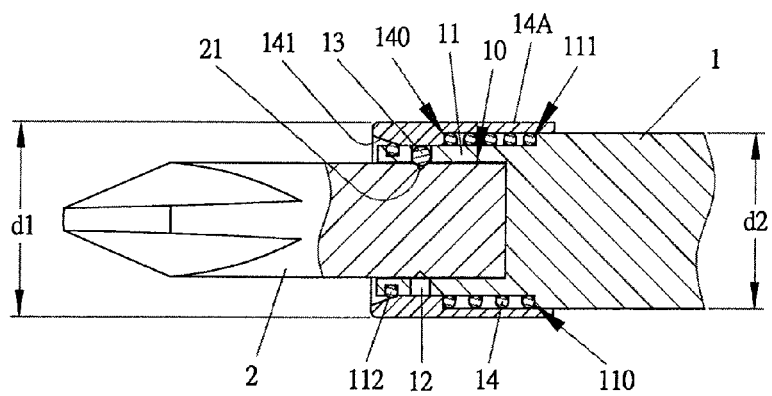
FIG. 5 is a cross-sectional view of a fifth conventional bit holder.
Figure 6:
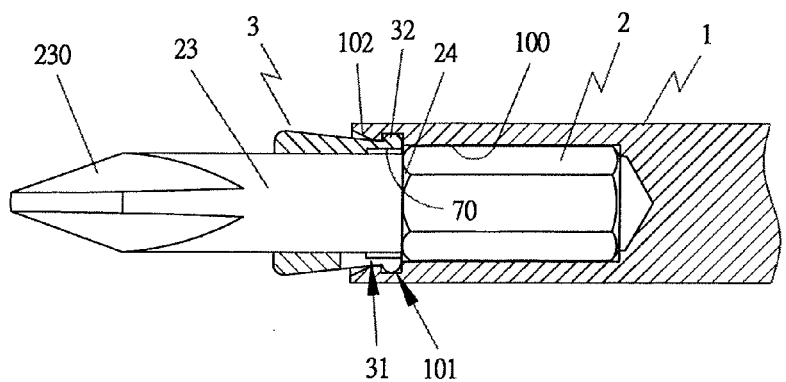
FIG. 6 is a cross-sectional view of a sixth conventional bit holder.
Figure 7:
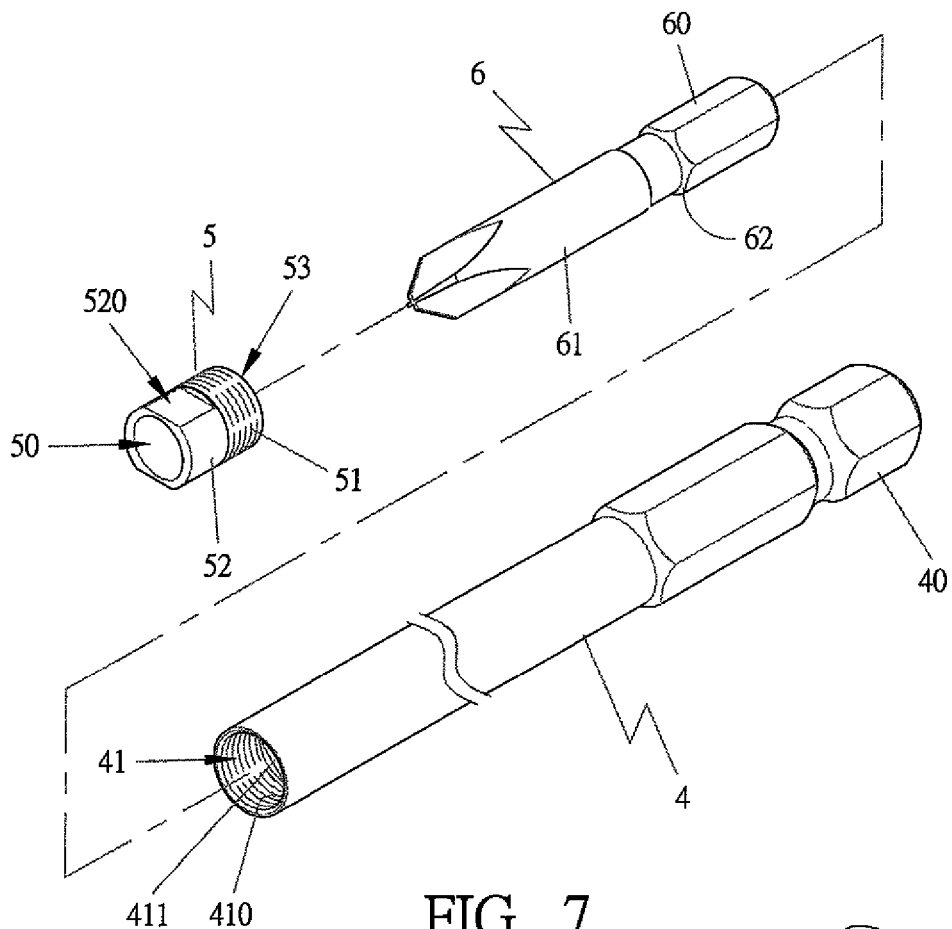
FIG. 7 is an exploded perspective view of a preferred embodiment of a bit holder in the present invention.
Figure 8:
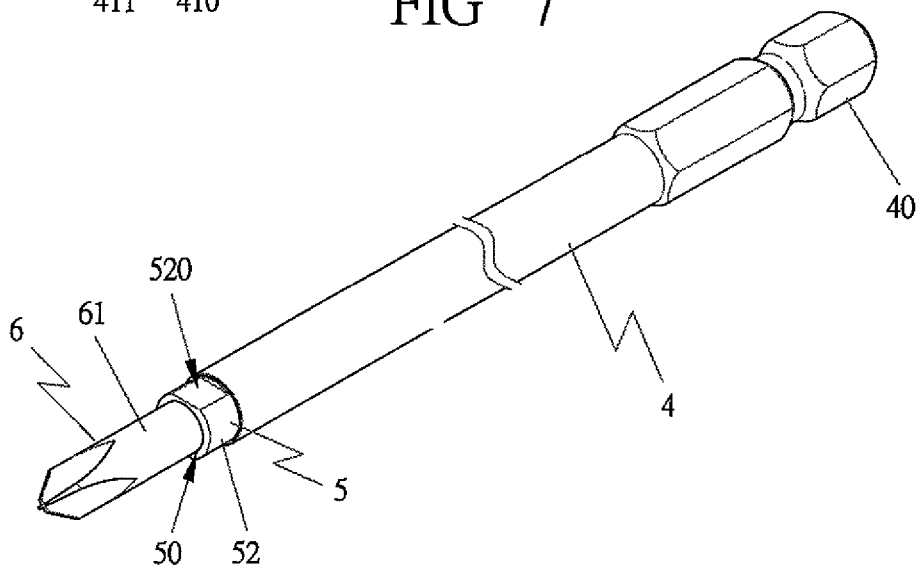
FIG. 8 is a perspective view of the preferred embodiment of a bit holder in the present invention.
Figure 9:
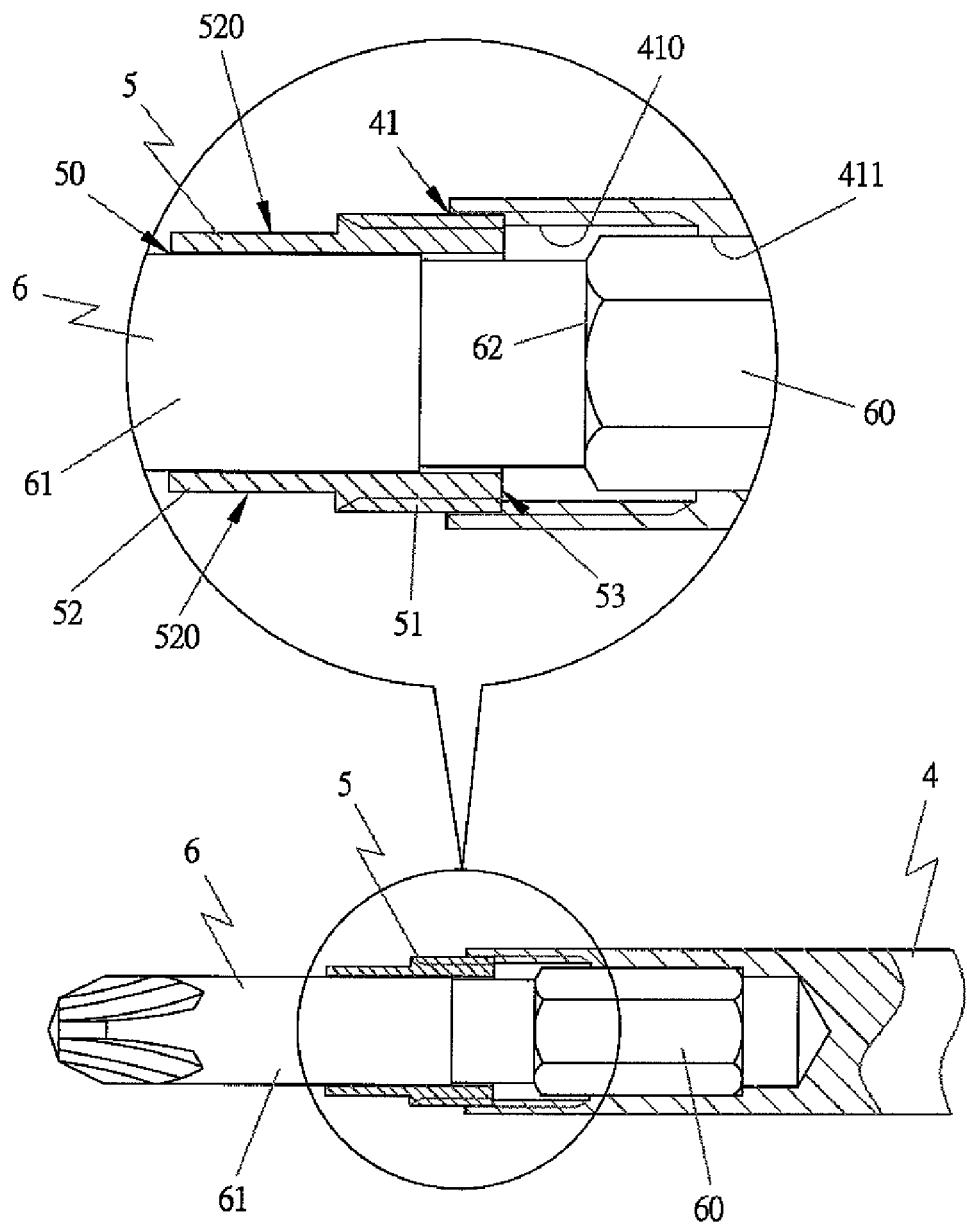
FIG. 9 is a cross-sectional and partial magnified cross-sectional view of the preferred embodiment of a bit holder in the present invention, showing a bit sleeve and a shank before they are completely combined together.

As shown in FIGS. 7~9, a preferred embodiment of a bit holder in the present invention includes a shank 4, and a bit sleeve 5.

Figure 10:
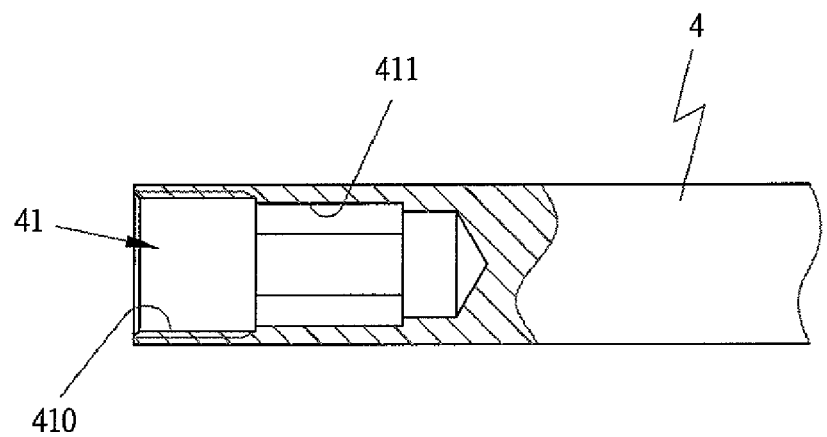
FIG. 10 is a cross-sectional view of the shank in the preferred embodiment of a bit holder in the present invention.

The shank 4 is provided with a non-circular geometric first end portion 40 for being engaged with a hand tool, and a second end portion formed with a combining hole 41. As shown in FIG. 10, the combining hole 41 is provided with female threads 410 formed around its partial inner wall for being engaged with the bit sleeve 5, and a polygonal surface 411 also formed around its partial inner wall for corresponding to a combining portion 60 of a bit 6.

Figure 13:
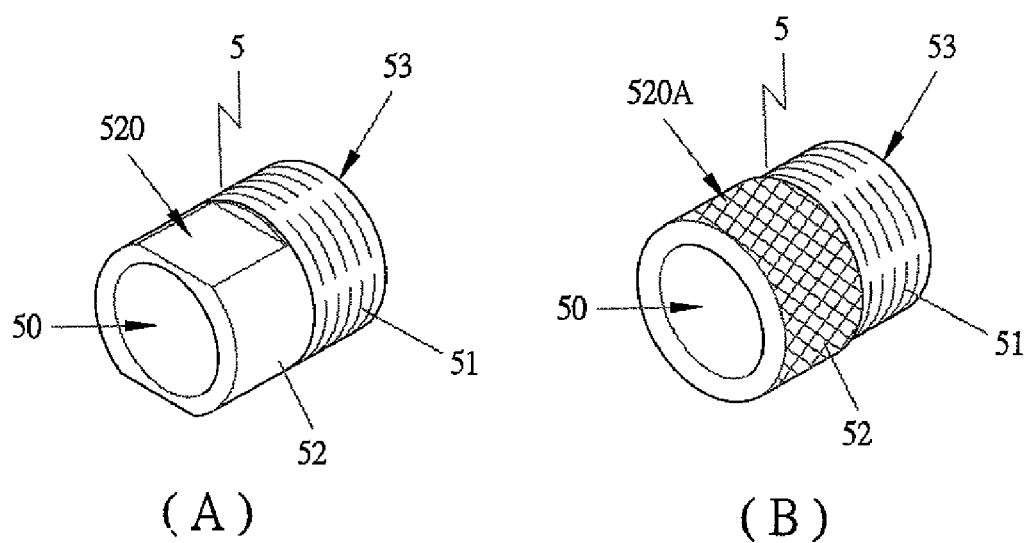
FIG. 13 is a perspective view of two preferred embodiments of the bit sleeve in the present invention.
Figure 14:
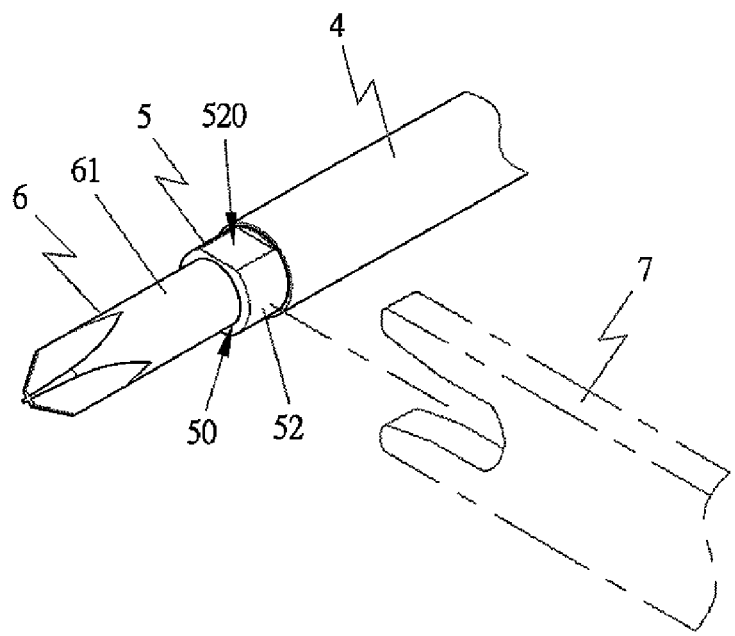
FIG. 14 is a perspective view of the preferred embodiment of a bit holder in the present invention, showing the bit sleeve being fixed with the shank by an auxiliary tool.
Figure 15:
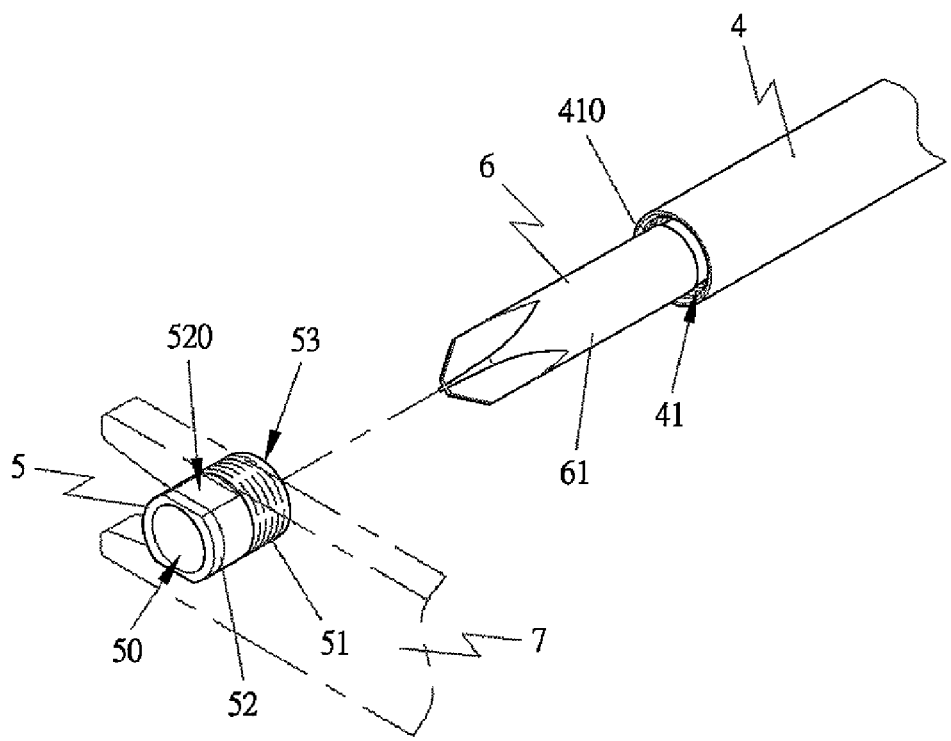
FIG. 15 is a perspective view of the preferred embodiment of a bit holder in the present invention, showing the bit sleeve being loosened from the shank by the auxiliary tool.

The bit sleeve 5, as shown in FIGS. 10~13, is provided with a through hole 50 for the bit 6 to penetrate through, male threads 51 formed around its rear portion for engaging with the female threads 410 of the combining hole 41 of the shank 4, and a circular circumference 52 for being twisted by an auxiliary tool 7 to keep the bit sleeve 5 fixed in or loosened from the combining hole 41 of the shank 4 so as to shift the bit 6. The circular circumference 52 is provided with two parallel flat surfaces 520 or a roughened surface 520A, as shown in FIG. 13. As shown in FIGS. 14 and 15, with the auxiliary tool 7 engaged with the flat surfaces 520 or the roughened surface 520A and turned around, the bit sleeve 5 can be fixed with or released from the shank 4 so as to shift bit 6.

The bit 6 is provided with a combining portion 60, a front portion 61, and an annular portion 62 formed between the combining portion 60 and the front portion 61.

As shown in FIG. 9, when the bit 6 is to be combined with the shank 4, it has to be first inserted through the through hole 50 of the bit sleeve 5. Then, the male threads 51 of the bit sleeve 5 are to be engaged with the female threads 410 of the combining hole 40 of the shank 4 by means of the auxiliary tool 7 fixed with the circular circumference 52 and rotated, enabling the bit sleeve 5 swiftly combined with the combining hole 40 of the shank 4.

Figure 11:
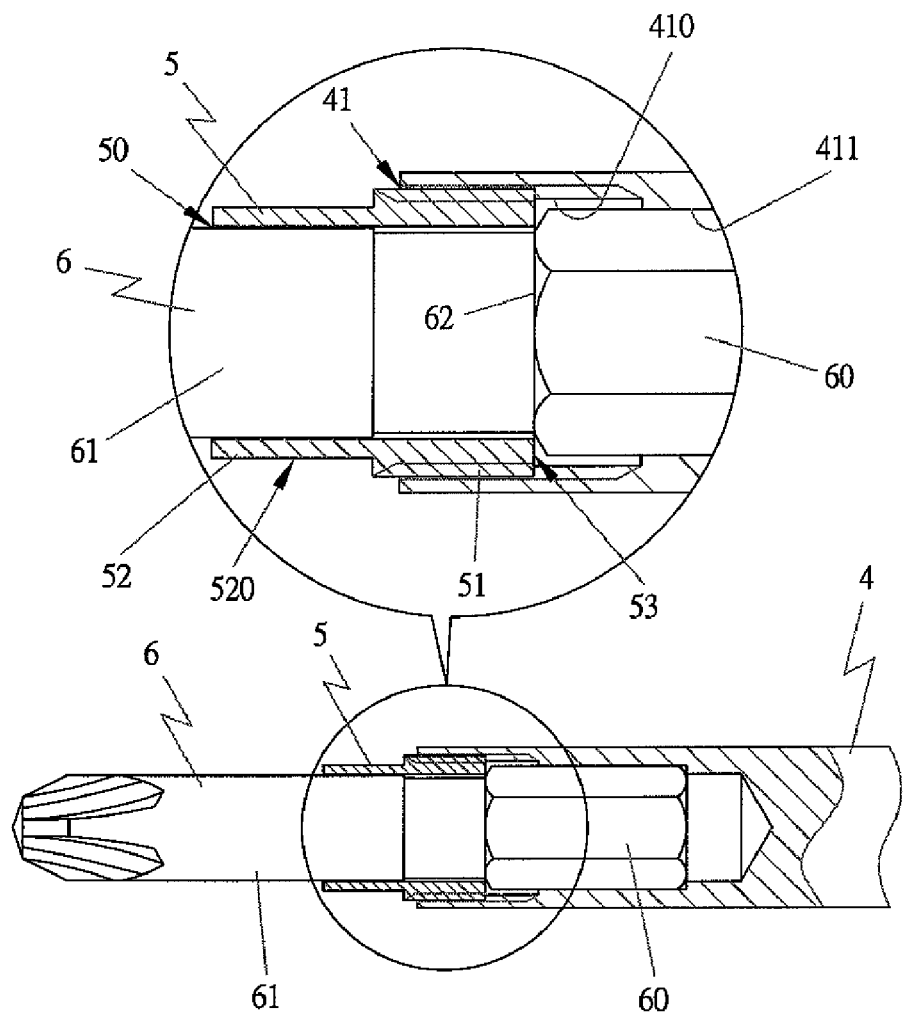
FIG. 11 is a cross-sectional and partial magnified cross-sectional view of the preferred embodiment of a bit holder in the present invention, showing a complete engagement of a bit sleeve with the shank.
Figure 12:
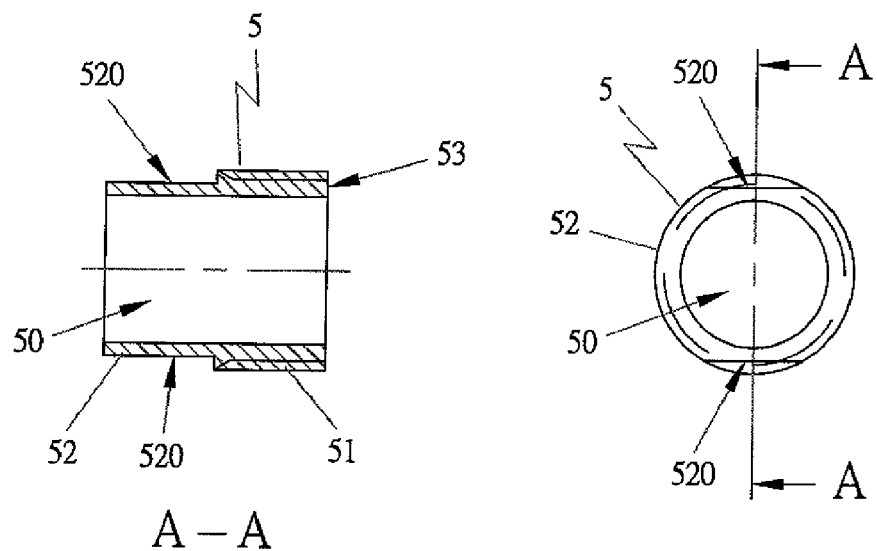
FIG. 12 is a front view of the bit sleeve and its cross-sectional view of a line 'A-A' in the preferred embodiment of a bit holder in the present invention.

Next, as shown in FIG. 11, after having the bit sleeve 5 engaged with the shank 4, a rear end surface 53 of the bit sleeve 5 is to rest on the annular portion 62 of the bit 6. In addition, as shown in FIG. 9, the female threads 410 of the combining hole 40 of the shank 4 has a sufficient length to overlap with part of the combining portion 60 of the bit 6 so as to enable the rear end surface 53 to always rest on the annular surface 62 of the bit 6 after having the bit 6 with diverse lengths of the combining portion 60 assembled together with the bit sleeve 5 and the shank 4, assuring a stable engagement between the bit 6 and the shank 4.

With the bit sleeve 5 keeping the bit 6 combined with the shank 4, not only the engagement error between the bit 6 and the shank 4 can be minimized, but also the bit 6 can stably drive a screw while being driven to whirl.

With the auxiliary tool 7 holding and loosening the bit sleeve 5 from the shank 4, the bit 6 can be quickly and conveniently shifted if needed anytime.

While engaging with the female threads 410 of the combining hole 41 of the shank 4, the male threads 51 of the bit sleeve 5 are swirled in a direction opposite to that of the bit 6 while being rotated to drive a screw, so that the bit sleeve 5 can be prevented from loosening from the shank 4 to advance security of operating a screwdriver combined with the bit holder.

While the preferred embodiment of the invention has been described above, it will be recognized and understood that various modifications may be made therein and the appended claims are intended to cover all such modifications that may fall within the spirit and scope of the invention.

What is claimed is:

1. A bit holder comprising:

a shank provided with a combining hole having part of its inner wall formed with female threads for engaging with a bit sleeve;

said bit sleeve provided with a through hole for being inserted with a bit and provided with male threads and an outer surface portion, said male threads being engaged with said female threads of said combining hole of said shank, said outer surface portion employed to be bit by an auxiliary tool so as to keep said bit sleeve fixed in or loosened from said combining hole of said shank; and said male threads of said bit sleeve to be engaged with said female threads of said combining hole of said shank after having said bit inserted in said through hole of said bit sleeve, said outer surface portion being held and controlled by said auxiliary tool to rotate so as to enable said bit sleeve fast engaged with said combining hole of said shank, an rear end surface of said bit sleeve resting on an annular portion of said bit after a complete engagement of said bit sleeve and said shank, wherein said bit has a combining portion for engaging with said combining hole, and said combining portion is larger than an inner diameter of said through hole of said bit sleeve so that said combining portion cannot pass through said through hole of said bit sleeve.

2. The bit holder as claimed in claim 1, wherein said shank is provided with a non-circular geometric rear end.

3. The bit holder as claimed in claim 1, wherein said bit sleeve is provided with two parallel flat surfaces on said outer surface portion thereof.

4. The bit holder as claimed in claim 1, wherein said bit sleeve is provided with a roughened surface on said outer surface portion thereof.

5. The bit holder as claimed in claim 1, wherein said female threads of said combining hole of said shank overlap partly with said combining portion of said bit.

* * * * *